United States Patent
Moncrieff

Patent Number: 5,973,909
Date of Patent: Oct. 26, 1999

[54] CAPACITOR AND METHOD WITH EXTRANEOUS PLATE SURFACE AREA

[76] Inventor: J. Peter Moncrieff, 408 Mason Rd., Vista, Calif. 92084

[21] Appl. No.: 08/815,312

[22] Filed: Mar. 11, 1997

Related U.S. Application Data

[63] Continuation of application No. 08/441,525, May 15, 1995, abandoned.

[51] Int. Cl.$^6$ .............. H01G 4/018; H01G 4/20
[52] U.S. Cl. .............. 361/312; 361/326; 361/323; 361/311
[58] Field of Search .............. 361/301.1, 303, 361/304, 306.1, 306.2, 306.3, 308.1, 311–313, 301.4, 301.5, 310

[56] References Cited

U.S. PATENT DOCUMENTS

| | | | |
|---|---|---|---|
| 2,108,995 | 2/1938 | Ruben | 361/530 |
| 2,335,714 | 11/1943 | Voigtmann | 361/313 |
| 3,569,795 | 3/1971 | Gikow | 361/434 |
| 4,128,857 | 12/1978 | Rayburn | 361/309 |
| 5,172,299 | 12/1992 | Yamada et al. | 361/321.2 |

Primary Examiner—Dean A. Reichard
Assistant Examiner—Anthony Dinkins

[57] ABSTRACT

A capacitor and method in which there is provided additional extraneous plate surface area, beyond the paired plate surface area normally provided to furnish capacitance. This additional extraneous plate surface area is located outside the intraplate internal volume, of plate pairs contributing substantial capacitance, or of mutually facing n-tuples of plates. Various configurations for this additional extraneous plate surface area are taught. This additional extraneous plate surface area can improve the electrical performance of the capacitor.

14 Claims, 4 Drawing Sheets

CAPACITOR AND METHOD WITH EXTRANEOUS PLATE SURFACE AREA

This is a continuation of application Ser. No. 08/441,525, filed May 15, 1995 now abandoned.

FIELD OF INVENTION

The present invention relates to capacitors and their plates, and to extraneous plate surface area that may be provided in a capacitor.

BACKGROUND OF THE INVENTION

A basic capacitor is formed by a matched pair of plates, placed in proximity, with a dielectric interposed between the pair of plates. Practical capacitors employ very thin plates with substantial surface areas, and dispose the pair of plates so that their surface areas are proximate and parallel, oppositely facing each other, separated only by a thin dielectric. The volume of space between this pair of plates, including the intervening dielectric and the plates themselves, may be said to represent the intraplate internal volume of the capacitor plate array.

Any physically real single plate has two surfaces, top and bottom. But, by convention, only one of these twin surfaces counts toward the plate surface area, and capacitance is computed on the basis of this plate surface area. We will follow this convention.

Prior art capacitors have shared a limitation in common: none have employed any substantial plate surface area that is extraneous—extraneous by virtue of being located outside the intraplate internal volume of the capacitor plate array, or by virtue of not contributing to the capacitance of the capacitor, or by virtue of being left over as a remainder after all conventional plate surface areas have been mutually paired off.

It has now been experimentally determined and demonstrated that improved capacitor performance can be realized by adding further plate surface area to a prior art capacitor—further plate surface area that is extraneous.

DESCRIPTION OF PRIOR ART

There have been several types of prior art capacitors, which are variations upon this basic capacitor comprising a matched pair of plates.

In one type, this matched pair of plates has been multiplied, for example to form a stacked capacitor. In this case, the intraplate internal volume of the capacitor plate array includes each volume of space between the two plates of each matched pair of plates. In contrast, the volume of space outside the two plates of each matched pair of plates, but between different pairs within the plate array, is part of the extraplate internal volume of the capacitor plate array.

In another type, the distance or mutual coverage between the two matched members of each pair has been adjustable, to form an adjustable capacitor. The same contrast between intraplate and extraplate internal volume applies.

In another type, this matched pair of plates has been rolled up into a cylindrical shape, to form a roll capacitor. The same contrast between intraplate and extraplate internal volume applies, to the layers within the rolled up cylinder.

In another type of capacitor, there has been a trio of plates. For example, a series connected capacitor actually consists of two capacitors in series, sharing a common plate between them (thus reducing the plate count for two capacitors from four to three). The common plate typically has substantially twice the surface area of the two end plates; the common plate faces the two end plates, which are disposed edge-on side by side to each other. Alternatively, three plates have been connected to capacitive charging and sensing circuits, for example to create a capacitive switch or memory cell that is on only when two out of the three plates have appropriate charges, or three plates have been connected to control-voltage circuits, for example to create a capacitor with electrically variable capacitance. While three plate capacitors have not had matched pairs of plates, they have had matched trios of plates proximately facing one another within each trio. Thus, the same contrast between intraplate and extraplate internal volume applies, but in this case to the volume of space inside each matched trio vs. the volume of space outside each matched trio. Furthermore, analysis of a matched trio of plates reveals that it still substantially comprises a matched pair of mutually facing plate surface areas (for example, for each plate trio of a series connected capacitor, the aggregate surface area of the two end plates is substantially matched to the facing surface area of the common plate).

In another type of capacitor, each single plate has been a single structural element having a hollowed out core that is filled with a dielectric material, instead of a solid metal core. This dielectric core has been one single plastic film that has been metallized identically on both sides, both sides then being electrically connected in common. This design is intended to give each plate twice the surface area insofar as current density is concerned, and thus half the current density per unit area, which is advantageous in some specialty applications such as high current, high frequency work. Prior art regards this single structural element as being one plate, not two. Indeed, prior art even regards the plastic core as a mere structural carrier (for which they have employed a plastic having inferior dielectric properties), not as a dielectric separating distinct plates (such a dielectric would be required to have superior dielectric properties). Moreover, this single structure with twin surfaces functions as one plate, not two, insofar as contributing to capacitance is concerned. Only one of the twin surfaces counts as surface area, in the same way that only one of the twin surfaces of a solid plate counts as surface area. Thus, this twin surface single plate structure with a plastic core is exactly the same as a twin surface single plate structure with a metal core, i.e. a conventional single plate, for purposes of the present invention, which are distinct from current density considerations. We will follow this convention of regarding such a single structural element, with twin surfaces thus connected in common, as one single plate, with one single plate surface area.

Several types of prior art capacitors have been enumerated above. All such types of prior art capacitors have shared a limiting feature in common. None have had any substantial extraneous plate surface area.

This is true in several senses of the word "extraneous", which the dictionary defines as either "located outside of", or "not essential or vital to", or "not belonging; foreign; coming from without".

More precisely, prior art capacitors have had no substantial extraneous plate surface area, by any of the following criteria of extraneousness.

Firstly, prior art capacitors have not had any substantial plate surface area that is extraneous by virtue of being located outside of the intraplate internal volume of the capacitor plate array.

Secondly, prior art capacitors have generally not had any substantial plate surface area that is extraneous by virtue of being not essential or vital to contributing to the capacitance of the capacitor.

Thirdly, in prior art capacitors substantially every portion of plate surface area can be exclusively paired off with a plate surface area of an oppositely facing plate, within a structure of mutually facing plates that are all electrically connected in a different manner. Consider the set of all such mutually paired off plate surface areas. Prior art capacitors have not had any substantial plate surface area that is extraneous by virtue of not belonging to, being foreign to, or coming from without this set of mutually paired off plate surface areas.

In sum, prior art capacitors have had no substantial plate surface area that is extraneous, in any of the senses of "extraneous". In contrast, the present invention teaches structures which do feature substantial plate surface area that is extraneous, in the first sense, or in the second sense, or in the third sense, or in any combination of these senses.

Yamada (U.S. Pat. No. 5,172,299) has taught a capacitor with a segmented plate having coplanar fingers of unequal size, a pair of such plates being mutually facing and oppositely facing, and being arranged so the small fingers of one plate face the large fingers of the other plate in the pair. All of Yamada's fingers and plates are located within the intraplate internal volume. Yamada does not show any plate surface area that is extraneous by virtue of being located outside the intraplate internal volume. Furthermore, in all of Yamada's drawings (e.g. his FIG. 5) and teachings, each plate, within each pair of oppositely facing plates, is shown as having substantially the same total plate surface area as the oppositely facing plate, each of the two plates comprising the same number of small fingers and the same number of large fingers. Hence, for each pair of Yamada's segmented plates, and thus for his capacitor as a whole, no substantial plate surface area is shown by Yamada that is extraneous by virtue of being left over as a remainder, after all possible surface areas of the two opposite polarities have been paired off as much as possible.

Gikow (U.S. Pat. No. 3,569,795) shows in his FIGS. 3–4 a single pair of oppositely facing capacitor plates that contribute substantial capacitance to his capacitor, with a plurality of voltage-control electrodes located between these two capacitive plates. All of Gikow's voltage-control electrodes are necessarily located inside the intraplate internal volume of his capacitor, since their only object is to polarize the dielectric located between the two capacitive plates. Gikow does not show any plate surface area that is extraneous by virtue of being located outside the intraplate internal volume. In his FIG. 1 Gikow shows a capacitor comprising a trio of plates, this capacitor essentially being a series-connected capacitor. All the plate surface areas shown in Gikow's FIG. 1 are located inside the intraplate internal volume. Gikow does not show any plate surface area that is extraneous by virtue of being located outside the intraplate internal volume.

Prior art has not made capacitors with extraneous plate surface area because of the added manufacturing expense, and because of the worse volumetric efficiency, since extraneous plate surface area would add volume but would not normally contribute significantly to capacitance.

However, it has now been experimentally determined and demonstrated that improved electrical performance can be realized by adding extraneous plate surface area to the structure of a capacitor.

OBJECTS AND ADVANTAGES

Accordingly, it is an object of the present invention to provide improved performance from a capacitor by incorporating substantial extraneous plate surface area.

Another object of the present invention is to provide improved performance from a capacitor by incorporating substantial extraneous plate surface area, where this plate surface area is extraneous by virtue of being located outside of the intraplate internal volume of the capacitor plate array; or by virtue of being not essential or vital to contributing to the capacitance of the capacitor; or by virtue of not belonging to, being foreign to, or coming from without the set of mutually paired off plate surface areas; or any combination thereof.

Another object of the present invention is to provide improved performance from a capacitor by incorporating substantial extraneous plate surface area in various possible structures.

Another object of the present invention is to provide improved performance from a capacitor by incorporating substantial extraneous plate surface area electrically connected in various possible manners.

It is hypothesized that there may be several reasons for the improved capacitor performance demonstrably obtained by incorporating extraneous plate surface area. For example, the extraneous plate surface area might act as an effective termination stub for the electromagnetic wave propagating along the non-extraneous surface of the main capacitor plate or plates. This termination stub could lessen undesirable reflections and standing waves on the main capacitor plates, where they could adversely affect the desired charging and discharging functions of the capacitor. This termination stub could be optimized in its dimensions, position, and manner of electrical connection, so as to optimize the desired charging and discharging functions of the capacitor.

Alternatively or additionally, the extraneous plate surface area might accumulate and lose electrical charge in sympathy with a non-extraneous area of main capacitor plate to which it is appropriately proximate or electrically connected. As such, the extraneous plate surface area might act as a shadow, echo, mirror, or reflection of the charge/discharge function occurring in the main capacitor plate. This in turn might affect the charge/discharge performance of a main capacitor plate area to which the extraneous plate surface area is appropriately proximate or electrically connected. Thus, the extraneous plate surface area is affected by the electrical charge/discharge function of one non-extraneous main plate area, and in turn affects the electrical charge/discharge function of a main plate area (either the same main plate area or another main plate area). It has been experimentally demonstrated that this effect can provide improved capacitor performance.

Further objects and advantages of the present invention will become apparent from a consideration of the drawings and ensuing description of preferred embodiments.

DESCRIPTION OF PREFERRED EMBODIMENTS

1. Elements and Structures from Prior Art

FIGS. 1a–1g show various types of prior art capacitors, for reference, and to show the foundation for the improvement of the present invention.

Figure 1A:
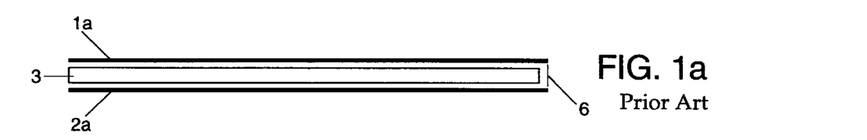
FIG. 1a shows an abstract basic flat two plate capacitor of prior art, in elevation view of the plate edges.

FIG. 1a shows a basic abstract capacitor structure, in elevation view of the plate edges. A first electrode or plate 1a is paired with a second electrode or plate 2a, and the pair of plates is separated from each other by a dielectric 3. In common engineering parlance, plate 1a is said to be of opposite electrical polarity to plate 2a. This commonly means that, when a capacitor is put to use, opposite polarity plates (or sets of plates) are connected to different circuit points or in a different manner. Thus, the two plates are distinctly electrically connected. In order for the two different plates 1a, 2a to function as a capacitor, they must be electrically connected not to the same point, but rather to two different circuit points, such that, under appropriate conditions, one plate can have an excess of one polarity of electrical charge (e.g. +), while the other plate simultaneously can have an excess of the opposite polarity electrical charge (e.g. −).

In FIG. 1a, the surface area of planar plate 1a substantially matches the oppositely facing surface area of paired planar plate 2a, in shape, dimensions, and mutually facing parallel position. The polygon of plate 1a is in substantial registration along all edges with the polygon of plate 2a. A boundary line 6 may be drawn at any of the plate edges, going from the edge of one plate to the corresponding edge of the paired facing plate, and in this case line 6 is orthogonal to the plane of either plate. There is no substantial plate surface area that is extraneous by virtue of extending beyond any boundary line 6 of these mutually registered polygon edges.

Substantially every portion of the surface area of plate 1a may be paired off with an equivalent portion of surface area of oppositely facing paired plate 2a. After all such portions of surface area, from oppositely facing paired plates, are paired off, there is no substantial plate surface area that is extraneous by virtue of being left over as a remainder after this pairing off.

The intraplate internal volume of the capacitor plate array could be said to comprise the volume of space contained between matching paired plates 1a and 2a, including the plates themselves and the dielectric that intervenes between this pair of plates. There is no substantial plate surface area that is extraneous by virtue of being located outside this intraplate internal volume. The intraplate internal volume could be said to be enclosed by the pair of plates and by the set of all possible orthogonal boundary lines 6 connecting the corresponding edges of the paired plates.

Substantially every portion of plate surface area contributes to the capacitance of the capacitor. There is no substantial plate surface area that is extraneous by virtue of not contributing to capacitance.

Figure 1B:
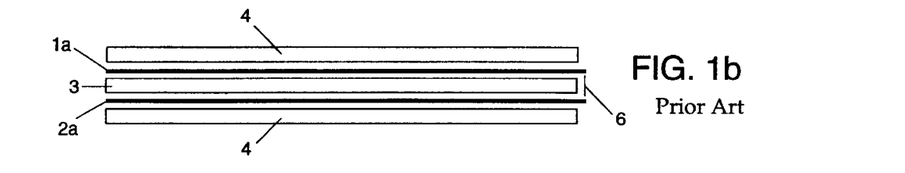
FIG. 1b shows a practical basic flat two plate capacitor of prior art, in elevation view of the plate edges.

FIG. 1b shows a basic practical flat plate capacitor in perspective view. It is essentially the same as the abstract capacitor shown in FIG. 1a, except that a dielectric 4 has been added outside the paired plates 1a, 2a. Dielectric 4 exists outside the intraplate internal volume of the capacitor plate array, and also outside the capacitor plate array as a whole. Dielectric 4 is useful for insulating the practical capacitor from the external world (note that dielectric 4 could simply be air).

Figure 1C:
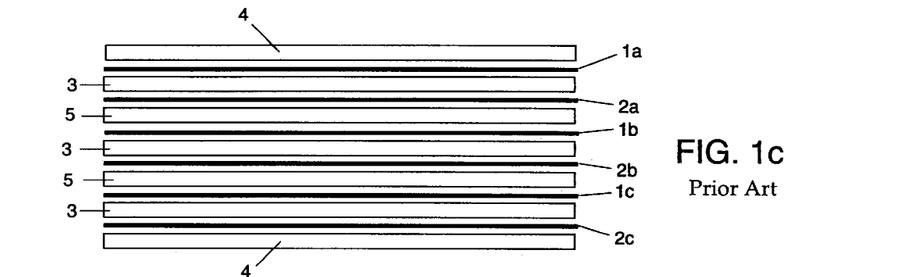
FIG. 1c shows a stacked flat multiple plate capacitor of prior art, in elevation view of the plate edges.

FIG. 1c shows a stacked flat plate capacitor in perspective view. This is essentially a multiple of the structure shown in FIGS. 1a–1b. Plate 1a is paired with plate 2a, as above. Likewise, a plate 1b is paired with a plate 2b, and a plate 1c is paired with a plate 2c, etc. All plates 1x with a "1" in their reference numeral (e.g. 1a, 1b, 1c, etc.) are electrically connected in common as one polarity, and all plates 2x with a "2" in their reference numeral (e.g. 2a, 2b, 2c, etc.) are electrically connected in common as the nominally opposite polarity. The "1" and "2" part of these plate reference numerals could be regarded as being indicative of the plate's polarity, as if they were a "+" and "−".

The polarity for each plate pair follows the same ordered sequence throughout the capacitor, so that the stack is a multiple of the FIGS. 1a–1b structure, with no inversions of this structure within the stack. Thus, the ordered plate sequence is 1a,2a,1b,2b,1c,2c, which has polarity sequence 1,2,1,2,1,2. Each ordered facing plate pair within the stack follows the same ordered pair polarity sequence 1 then 2.

Dielectric 3 separates the oppositely facing plates of each pair from each other: 1a from 2a, 1b from 2b, 1c from 2c, etc. Dielectric 3 is the intraplate dielectric, located inside the intraplate internal volume of the capacitor plate array. Dielectric 4 is located outside each pair of matched facing plates, and outside the plate array as a whole, just like dielectric 4 in FIG. 1b. Within the capacitor plate array, a dielectric 5 separates one pair of plates from another pair. Dielectric 5 is located inside the extraplate internal volume of the capacitor plate array; it is outside the intraplate internal volume, but it is inside the volume of the plate array as a whole. Dielectric 4 is located outside the volume of the capacitor plate array as a whole.

Regardless of the total number of pairs of plates, prior art capacitors have contained only matched pairs of plates. That is, every single plate of one polarity faces a matching plate, which has substantially the same surface dimensions, with a dielectric intervening, where the matching plate is distinctly electrically connected (e.g. in opposite polarity).

For any pair of plates 1x, 2x the surface area of planar plate 1x substantially matches the oppositely facing surface area of planar plate 2x, in shape, dimensions, and oppositely facing parallel position. The polygon of plate 1a is in substantial registration along all edges with the polygon of plate 2a. There is no substantial plate surface area that is extraneous by virtue of extending beyond the boundaries of these mutually registered polygon edges.

For each pair of plates 1x, 2x substantially every portion of the surface area of plate 1x may be paired off with an equivalent portion of surface area of oppositely facing plate 2x, where plates 1x and 2x are ordered facing pairs all having the same ordered pair polarity sequence. After all such portions of surface area are paired off, there is no substantial plate surface area that is extraneous by virtue of being left over as a remainder after this pairing off.

Since the FIG. 1c structure is a multiple of the simpler FIG. 1a–1b structure repeating itself, another way of looking at this is to first identify the one simpler structure that repeats itself to form the overall capacitor. Given one (perhaps repeating) structure comprising a pair of plates in a capacitor stack, where all repetitions of this ordered plate pair have the same ordered pair polarity sequence, then substantially every portion of the surface area of every one plate may be paired off with an equivalent portion of surface area of an oppositely facing plate. After all such portions of surface area are paired off, there is no substantial plate surface area that is extraneous by virtue of being left over as a remainder after this pairing off.

The intraplate internal volume of the capacitor plate array could be said to comprise the aggregate of the volume of space contained within every pair of matched oppositely facing paired plates 1x and 2x, including the plates themselves and the dielectric 3 that intervenes between each pair of plates. This intraplate internal volume is fragmented in a multiple stacked plate capacitor, since a slice of extraplate internal volume (coinciding with dielectric 5 in FIG. 1c) intervenes between slices of intraplate internal volume. There is no substantial plate surface area that is extraneous by virtue of being located outside this intraplate internal volume.

Substantially every portion of plate surface area contributes to the capacitance of the capacitor. There is no substantial plate surface area that is extraneous by virtue of not contributing to capacitance.

Figure 1D:
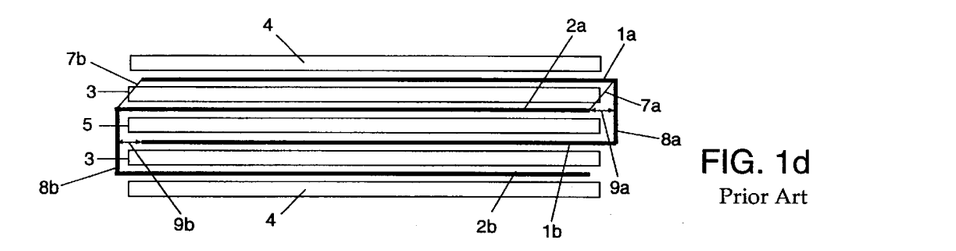
FIG. 1d shows a stacked flat multiple plate capacitor of prior art, in elevation view of the plate edges.

FIG. 1d shows a detail of a stacked capacitor in elevation view. It is common to employ a conductive end spray 8a to connect together the several plates 1a, 1b, etc. of like polarity.

The art recognizes that means suitable for making electrical connections to capacitor plates, e.g. end spray 8a and/or wire or stub terminals, are commonly used to electrically connect capacitor plates to the external world. The art recognizes that such means for making electrical connections to capacitor plates are not themselves plates; thus such means do not have any plate surface area, and perforce they do not have any extraneous plate surface area. Furthermore, it is common for the structures of such means to be substantially similar for the both (or several mutually facing) distinctly connected plates or sets of plates, and thus there has not been substantial surface area on one connecting structure that is extraneous by virtue of not being matched by a surface area on the other connecting structure.

To prevent this end spray from electrically shorting to opposite polarity plates 2a, 2b, etc. it is common to offset the alignment registration of the two polarities of plates by a small margin and/or offset 9a, recessing plates 2a, 2b, etc. by this small margin and/or offset. The area of this small margin and/or offset is insignificant compared to the surface area of the plates, so it does not represent a substantial surface area. The two plates of each oppositely facing pair are still substantially in registration alignment. No substantial plate surface area is extraneous by virtue of not contributing to capacitance.

Furthermore, the intraplate internal volume of space between a matched oppositely facing pair of plates is merely skewed slightly by any margin and/or offset, so that its boundary is exemplified by a line 7a, which in this case is diagonal and not perfectly orthogonal to the planar plates. The intraplate internal volume may be said to be delimited by each facing pair of plates and by the set of all possible boundary lines 7a connecting the corresponding edges of the paired plates on this side of the capacitor plate array. Thus it remains true that there is no substantial plate surface area that is extraneous by virtue of being located outside this intraplate internal volume, or by virtue of extending beyond any boundary line 7a.

Figure 1E:
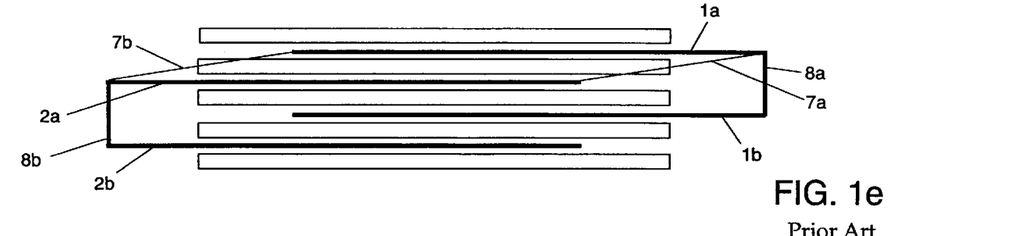
FIG. 1e shows an adjustable multiple plate capacitor of prior art, in elevation view of the plate edges.

At the opposite side of the capacitor plate array, a diagonal boundary line 7b corresponding to and parallel to line 7a may be drawn. Just as the set of boundary lines 7a delimits the intraplate internal volume on its side, so also the set of boundary lines 7b delimits the intraplate internal volume on its side. Thus, in a capacitor plate structure such as FIG. 1d, consisting of just one pair of oppositely facing plates contributing substantial capacitance (or in a capacitor comprising multiple repetitions of this plate structure), the intraplate internal volume could be said to be enclosed by the set of opposing, corresponding, parallel boundary lines 7a–7b. Therefore, in a capacitor where no more than two plates contributing substantial capacitance are oppositely facing one another in a single group or array, the intraplate internal volume could be said to always be enclosed by parallel lines, be they orthogonal lines like line 6 (FIGS. 1a–1b) or diagonal lines like lines 7a–7b (FIGS. 1d–1e).

An end spray 8b connects together the several plates 2a, 2b, etc. of like polarity, while plates 1a, 1b, etc. are recessed by a small margin and/or offset 9b which is equivalent to margin and/or offset 9a. Because the boundary lines 7a and 7b are parallel, the surface area of every paired plate 1x is equal to the surface area of its oppositely facing paired plate 2x. Thus it remains true that for each pair of plates 1x, 2x substantially every portion of the surface area of plate 1x may be paired off with an equal portion of the surface area of oppositely facing plate 2x, where plates 1x and 2x are ordered facing pairs all having the same ordered pair polarity sequence. After all such portions of surface area are paired off, there is no substantial plate surface area that is extraneous by virtue of being left over as a remainder after this pairing off.

In a special type of stacked plate capacitor the capacitance is adjustable, for example by varying the registration alignment between opposite polarity sets of plates (e.g. a rotary variable condenser).

The function of such a capacitor is to provide a maximum capacitance, and then also some lesser amounts of capacitance via adjustment. This maximum capacitance function is provided when the opposite polarity sets of plates are maximally interleaved. In this position, the capacitor structure is configured similarly to FIGS. 1c–d. Substantially every portion of plate surface area contributes to the capacitance of the capacitor in this configuration. Thus, in general for such a capacitor, there is no substantial plate surface area that does not contribute to the capacitance for at least some part of the capacitor's functioning range. Thus, it remains true that in such a capacitor there is no substantial plate surface area that is extraneous by virtue of not (ever having the function of) contributing to capacitance.

When such a capacitor is adjusted for less than maximum capacitance, it assumes a configuration with opposite polarity sets of plates being less than maximally interleaved, a detail of which is shown in FIG. 1e, in elevation view. FIG. 1e is similar to FIG. 1d, except that the diagonal boundary lines 7a, 7b have become even more slanted. Thus it remains true that there is no substantial plate surface area that is extraneous by virtue of being located outside this intraplate internal volume, or by virtue of extending beyond any parallel boundary line 7a or 7b.

Because the boundary lines 7a and 7b are parallel, the surface area of every paired plate 1x is substantially equal to the surface area of its oppositely facing paired plate 2x. Thus it remains true that for each pair of plates 1x, 2x substantially every portion of the surface area of plate 1x may be paired off with an equal portion of the surface area of oppositely facing plate 2x, where plates 1x and 2x are ordered facing pairs all having the same ordered pair polarity sequence. After all such portions of surface area are paired off, there is no substantial plate surface area that is extraneous by virtue of being left over as a remainder after this pairing off.

Figure 1F:
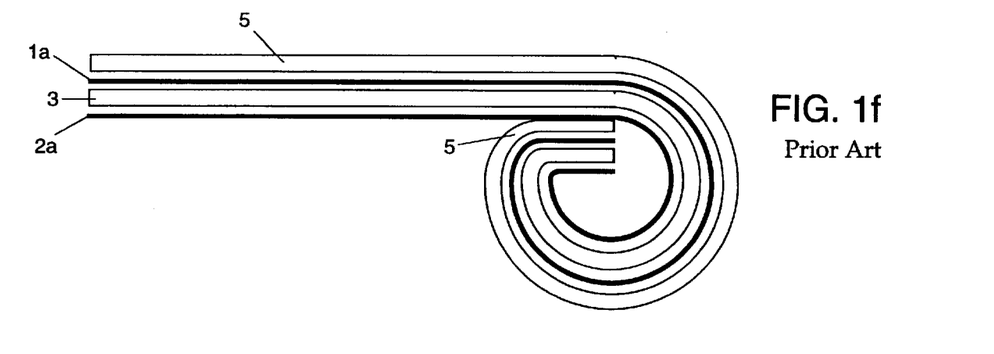
FIG. 1f shows how a flat sandwich structure is rolled up to form a roll capacitor of prior art, in elevation view of the plate edges.

The basic two plate flat capacitor structure shown in FIGS. 1a–1b may also be formed into a three dimensional shape, for example by being rolled up into a cylindrical shape, to form a roll capacitor. FIG. 1f shows a detail of the manner in which the flat structure is rolled up into a cylindrical structure, in elevation view as seen from one end of the cylinder. Paired facing plates 1a and 2a are separated by dielectric 3; the sandwich of these three elements again delimits the intraplate internal volume of the capacitor plate array, both in the flat form and also in the rolled up form, where it becomes a spiral. The volume of space occupied by dielectric 5 again indicates the extraplate volume of the capacitor plate array; in the flat form this extraplate volume is outside the whole plate array, while in the rolled up form this extraplate volume is rolled up as a spiral and trapped inside the cylinder, to become part of the extraplate internal volume of the capacitor plate array. Dielectric 5 could lie on just the top side of the sandwich structure as shown, or on just the under side, or both.

Since a roll capacitor has essentially the same structure as a flat basic capacitor with one pair of plates, but simply rolled up, it remains true that roll capacitors have not had any substantial plate surface area that is extraneous by virtue of not contributing to capacitance, or by virtue of being outside the intraplate internal volume of the capacitor, or by virtue of being left over as a remainder after surface areas of oppositely facing paired plates are paired off.

Roll capacitors commonly have employed extended foil construction, where a conductive end spray meets a slightly extended foil edge for every layer of the cylindrical roll. This involves very small margins and/or offsets, in a structure substantially identical to that already described and shown in FIG. 1d for a stacked plate capacitor. Thus, it remains true that no substantial plate surface area is extraneous by virtue of not contributing to capacitance, or by virtue of being located outside the intraplate internal volume (e.g. extending beyond parallel boundary lines such as 7a–7b of FIG. 1d), or by virtue of being left over as a remainder after all possible surface areas on plates 1a and 2a have been paired off.

Some prior art capacitors have employed a trio of plates, each being electrically connected in a different manner (e.g. to a different circuit or circuit point). Thus, these plates have had mutually diverse polarities (instead of simply opposite polarities). As such, they are still distinctly electrically connected from one another. Diverse polarities imply two or more different manners of electrical connection, different for each plate element in a designated group said to have diverse polarities. Opposite polarities imply merely two manners of electrical connection for a designated group limited to two plate elements.

Figure 1G:
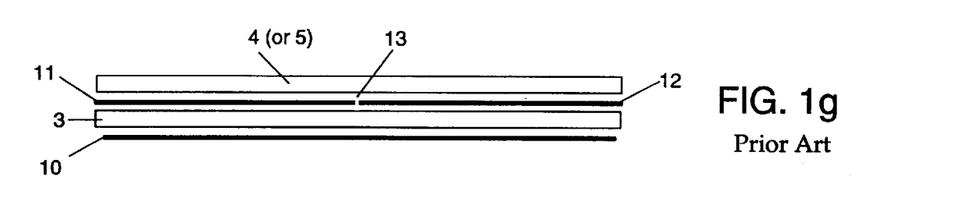
FIG. 1g shows a basic flat three plate capacitor of prior art, in elevation view of the plate edges.

A common general structure for such capacitors is shown in FIG. 1g, in elevation view of the plate edges. A large plate 10 faces two smaller plates, a plate 11 and a plate 12. Plates 11 and 12 are disposed edge-on side by side, separated from each other by a small gap 13. Plates 11 and 12 jointly face plate 10, across dielectric 3. The volume of space occupied by plates 10, 11, 12 and dielectric 3 delimits the intraplate internal volume of the capacitor plate array, so, in a plate structure comprising three or more mutually facing plates contributing substantial capacitance, the intraplate internal volume extends out to the outermost peripheral edges of the outermost of all the mutually facing plates. Thus, it can be appreciated that, in a plate array structure comprising three or more mutually facing plates contributing substantial capacitance, the opposing, corresponding boundary lines delimiting the intraplate internal volume might not be parallel for prior art structures. It was shown above (for FIGS. 1a–1b and 1d–1e) that, in a plate array structure consisting of only two paired, oppositely facing plates contributing substantial capacitance (or in a capacitor comprising multiple repetitions of this single paired-plate structure), the opposing, corresponding boundary lines 6 or 7a–7b delimiting the intraplate internal volume are parallel.

Dielectric 4 lies outside this intraplate internal volume, and outside the plate array as a whole. Dielectric 4 could lie on just the top side of the capacitor plate array as shown, or on just the under side, or both. It remains true that there is no substantial plate surface area that is extraneous by virtue of being located outside the intraplate internal volume of the capacitor plate array.

Gap 13 is typically very small, and is typically insignificant compared to the surface area of plates 10, 11, 12, like margins and/or offsets 9a and 9b in FIG. 1d. Gap 13 has been kept small in prior art capacitors because a large gap would be wasteful of material, hence more expensive to manufacture and also volumetrically inefficient. The area of plate 10 immediately opposite gap 13 does not contribute to the capacitance of the capacitor. However, because gap 13 has been kept so small in prior art capacitors, it remains true that no substantial plate surface area is extraneous by virtue of not contributing to capacitance.

In terms of plates, the basic structure of FIG. 1g has a trio of plates, not a pair (and other similar structures might have a quartet of plates, etc.). But in terms of plate surface area, it remains true that substantially every portion of plate surface area is paired with a portion of plate surface area on an oppositely facing plate. For example, in FIG. 1g substantially every portion of the surface area of plate 10 is paired off with a portion of plate surface area, either on oppositely facing plate 11 or on oppositely facing plate 12. After all such portions of surface area are paired off, there is no substantial plate surface area that is extraneous by virtue of being left over as a remainder after this pairing off.

All three plates of the trio in FIG. 1g could be said to be mutually facing. A designated group of plate elements could be said to be mutually facing if, for every possible pair of the group on different planes, at least one straight line can be drawn between each possible pair of the group, without that line passing through any other single conductive element (including its offsets and/or margins, such as shown in FIGS. 1d–1e) in a direction perpendicular to that other single conductive element. In other words, no single conductive element (including its offsets and/or margins, such as shown in FIGS. 1d–1e) completely intervenes between two plates of the designated mutually facing group that are on different planes from one another. Thus, for example, plates 10, 11, 12 are mutually facing by this criterion. If there were three plates such as 11, 12 (instead of two) side by side, jointly facing plate 10, then the plates of this quartet would also be mutually facing by this criterion.

On the other hand, two plates could be said to be oppositely facing each other if a preponderance of the lines that can be drawn perpendicular to one of the two plates also pass through the other plate. Thus, in FIG. 1g plates 10 and 11 are oppositely facing, and plates 10 and 12 are oppositely facing, but plates 11 and 12 are not oppositely facing. Generally speaking, capacitance is created from matching plate surface areas on oppositely facing plates.

The basic structure shown in FIG. 1g is similar to the basic structure shown in FIGS. 1a–1b, being a simple flat sandwich structure with plates on merely two planes. This basic structure could then be multiplied to form a stacked plate capacitor structure, similar to that shown in FIGS. 1c–1d, or it could be rolled up to form a roll capacitor structure, similar to that shown in FIG. 1f. In either case, similar considerations apply to those described above. In either case, dielectric 4 could be more properly regarded as dielectric 5 (as shown in FIGS. 1c–1d and 1f), since it has become located inside the extraplate internal volume, inside the plate array as a whole. The volume of space occupied by dielectric 5 is still outside the intraplate internal volume of the capacitor plate array. It remains true that there is no substantial plate surface area that is extraneous by virtue of being located outside the intraplate internal volume of the capacitor plate array.

In the case of a stacked capacitor, the FIG. 1g structure with its trio of plates could be multiplied and repeated throughout the stack. The diverse polarities of one plate trio follow an ordered sequence, and this same ordered trio diverse polarity sequence would be repeated for all multiples of the FIG. 1g structure in the stack. Thus, the same considerations described for the FIG. 1c stacked capacitor apply here, except that references to a pair of facing plates should be replaced by references to a trio of mutually facing plates. In order to accommodate stacked capacitors with a variety of repeated structures, the nomenclature herein can be expanded from "pair" to "n-tuple" where required.

2. Structural Configurations of Extraneous Plate Surface Area

FIGS. 2a–2e show examples of some preferred embodiments of the present invention, and the improvements it teaches over prior art, with respect to some possible structural configurations of the extraneous plate surface area that is claimed by the present invention.

Figure 2A:
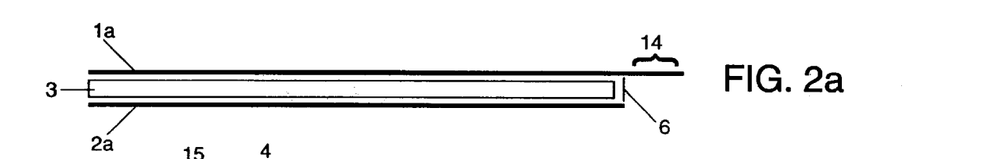
FIG. 2a shows one embodiment of the present invention, as applied to a basic flat two plate capacitor, in elevation view of the plate edges.

FIG. 2a shows a basic flat plate capacitor with one pair of plates, in elevation view. FIG. 2a is similar to FIG. 1a, to show by way of contrast an improvement taught by the present invention. As before, plate 1a is paired with plate 2a, and the two plates are separated by dielectric 3. The improvement shown in FIG. 2a is a substantial surface area 14 of plate 1a, where plate 1a is substantially larger than plate 2a and thereby extends beyond the edge boundaries of plate 2a. The two plates are not in registration alignment around their periphery. Orthogonal boundary line 6, drawn from the edge of plate 2a, fails to meet the edge of plate 1a for all points around the periphery of plate 2a.

Surface area 14 of plate 1a is a substantial plate surface area that is extraneous. It is extraneous by virtue of not contributing to the capacitance of the capacitor. It is also extraneous by virtue of being located outside the intraplate internal volume of the capacitor plate array, since it is outside some lines defining intraplate internal volume (for a two plate structure), lines such as orthogonal boundary lines 6 drawn from the edge of smaller plate 2a, and/or boundary lines 7a that could be drawn from the right edge of smaller plate 2a in FIG. 2a to be parallel to corresponding boundary lines 7b drawn from the left edge of plate 2a (this would be especially relevant to FIG. 2a if the registration of plates 1a and 2a were offset, such as shown in FIGS. 1d–1e). As discussed above, in a capacitor plate structure consisting of just one pair of oppositely facing plates contributing substantial capacitance (or in a capacitor comprising multiple repetitions of this plate structure), the intraplate internal volume could be said to be enclosed by the set of opposing, corresponding, parallel boundary lines. Thus, in a capacitor where no more than two plates contributing substantial capacitance are oppositely facing one another in a single group or array, the intraplate internal volume could be said to always be enclosed by parallel lines, be they parallel orthogonal lines like line 6 (FIGS. 1a–1b) or parallel diagonal lines like lines 7a–7b (FIGS. 1d–1e). Therefore, in a paired plate structure like FIG. 2a, surface area 14 is located outside the intraplate internal volume. Surface area 14 is also extraneous by virtue of being left over as a substantial remainder, after all portions of surface area on plate 2a are paired off with a matching portion of surface area on paired facing plate 1a.

Extraneous plate surface area 14 might extend beyond the edges of plate 2a in either dimension, or in a plurality of dimensions. Extraneous plate surface area 14 might be shaped in a variety of ways, including three dimensionally, and might comprise a variety of distinct segments.

The addition of extraneous plate surface area 14 can provide improved performance for a capacitor over prior art. The degree and nature of improved performance could be varied and optimized by altering the dimensions, shape, and position of extraneous plate surface area 14.

There might be several reasons for the improved performance realized by incorporating extraneous plate surface area 14. For example, it is hypothesized that, in configurations similar to FIG. 2a, extraneous plate surface area 14 might act as an effective termination stub for the electromagnetic wave propagating along the non-extraneous surface of the main capacitor plate or plates. This termination stub could lessen undesirable reflections and standing waves on the main capacitor plates, where they could adversely affect the desired charging and discharging functions of the capacitor. This hypothesis could also be relevant to all other configurations and embodiments of the present invention, such as those described below.

Figure 2B:
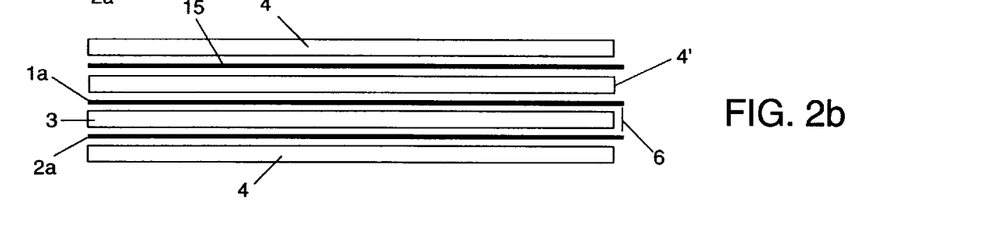
FIG. 2b shows one embodiment of the present invention, as applied to a basic flat two plate capacitor, in elevation view of the plate edges.

FIG. 2b shows alternative or additional aspects of the present invention, shown here as applied to a basic flat plate capacitor with one pair of plates, in elevation view. FIG. 2b is similar to FIG. 1b. As before, plate 1a is paired with plate 2a, the two plates are separated by dielectric 3, and dielectric 4 is located outside the intraplate internal volume of the plate array and outside the plate array as a whole. The improvement shown in FIG. 2b comprises a substantial extraneous plate surface area 15, which is located outside the intraplate internal volume of the plate array, indeed in this case outside the main (non-extraneous) plate array as a whole. Plate surface area 15 is separated from plate 1a by a dielectric 4'. Dielectric 4' is located inside of the outermost conductive element (here extraneous plate surface area 15), but it is regarded as an instance of dielectric 4 because it is still outside the non-extraneous plate array as a whole, i.e. it is outside the outermost main (non-extraneous) plates (here plates 1a and 2a).

Surface area 15 is a substantial plate surface area that is extraneous. It is extraneous by virtue of not substantially contributing to the capacitance of the capacitor. It is also extraneous by virtue of being located outside the intraplate internal volume of the capacitor plate array. It is also extraneous by virtue of being left over as a remainder, after all portions of surface area on plate 2a are paired off with a matching portion of surface area on paired facing plate 1a.

Extraneous plate surface area 15 might be smaller, larger, or equal to plate 1a or 2a in either dimension, or in a plurality of dimensions. Extraneous plate surface area 15 might be shaped in a variety of ways, including three dimensionally, and might comprise a variety of distinct segments. There might be several layers of extraneous plate surface area 15, perhaps separated from one another by layers of dielectric 4'.

The addition of extraneous plate surface area 15 can provide improved performance for a capacitor over prior art. The degree and nature of improved performance could be varied and optimized by altering the dimensions, shape, and position of extraneous plate surface area 15.

There might be several reasons for the improved performance realized by incorporating extraneous plate surface area 15. For example, it is hypothesized that, in configurations similar to FIG. 2b, extraneous plate surface area 15 might accumulate and lose electrical charge in sympathy with a non-extraneous area of main capacitor plate to which it is appropriately proximate and/or electrically connected. As such, the extraneous plate surface area might act as a shadow, echo, mirror, or reflection of the charge/discharge function occurring in the main capacitor plate. This in turn might affect the charge/discharge performance of a main capacitor plate area to which the extraneous plate surface area is appropriately proximate and/or electrically connected.

Thus, the extraneous plate surface area could be affected by the electrical charge/discharge function of one non-extraneous main plate area, and in turn could affect the electrical charge/discharge function of a main plate area (either the same main plate area or another main plate area). This hypothesis could also be relevant to all other configurations and embodiments of the present invention, such as those described below. For example, it has been experimentally demonstrated that the structure of FIG. 2b provides improved capacitor performance over the prior art structure of FIG. 1b, even when extraneous plate surface area 15 is not electrically connected to anything. It is likely in this case that extraneous plate surface area 15 is affected by the electrical charge/discharge function of proximate plate 1a, and in turn affects the electrical charge/discharge function of proximate plate 1a (and thus the whole capacitor), providing improved performance.

Based on principles recognized by the art, it can be appreciated that the effects and advantages described in the previous two paragraphs could be affected by the proximity of extraneous plate surface area 15 to proximate plate 1a, and by the amount of extraneous plate surface area 15 that is proximate to plate 1a and also is overlapping to plate 1a, this overlapping being such that a line could be drawn perpendicular to extraneous plate surface area 15 that will intersect both extraneous plate surface area 15 and plate 1a. It follows that it could be advantageous to dispose a substantial portion of extraneous plate surface area 15 very close to proximate plate 1a, so that these two elements are closely spaced. And it follows that it could be further advantageous to dispose all of extraneous plate surface area 15 such that it is very close to proximate plate 1a, and furthermore overlaps plate 1a, and furthermore is substantially parallel to plate 1a in order to maximize achievable proximity. For example, FIG. 2b shows an embodiment wherein all of extraneous plate surface area 15 is substantially parallel to and overlapping to plate 1a, and wherein the proximity of extraneous plate surface area 15 to plate 1a is approximately equal to the proximity of plate 1a to plate 2a, since dielectric 4' is shown as having approximately the same thickness as dielectric 3. It is noted that dielectric 4' could be much thicker than dielectric 3, thus making the distance of extraneous plate surface area 15 to proximate plate 1a much greater than the distance of plate 1a to plate 2a, resulting in a lessening of the effects discussed in the previous two paragraphs. If all of extraneous plate surface area 15 were substantially parallel to and overlapping to and proximate to plate 1a, then it follows that its distance from plate 1a could perhaps be relatively large while still maintaining desired effects; whereas if only a portion of extraneous plate surface area 15 were parallel to and overlapping to and proximate to plate 1a, then it follows that to maintain the same desired effects it might be advantageous to reduce the distance between plate 1a and that portion of extraneous plate surface area 15 which is parallel to and overlapping to and proximate to plate 1a.

It has been experimentally determined and demonstrated that the precise choice of dimensions, shape, and position for extraneous plate surface area could be very critical in optimizing the improved capacitor performance, as could the parameters for any dielectric (e.g. dielectric 4') that separates and positions each extraneous plate surface area. For example, too large an extraneous plate surface area could yield suboptimal performance, just as too small an area could. This criticality lends credence to the two hypotheses above, and mitigates against some other possible hypotheses. For instance, if the extraneous plate surface areas were acting merely as isolating shields, then their dimensions, shape, and position would not be as critical (since, with a shield, the larger it is, the better the isolation performance should be).

Figure 2C:
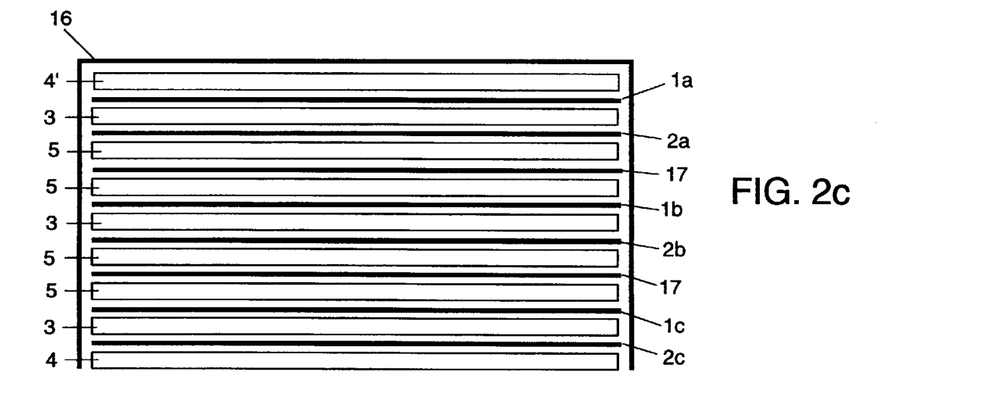
FIG. 2c shows one embodiment of the present invention, as applied to a stacked flat multiple plate capacitor, in elevation view of the plate edges.

FIG. 2c shows alternative or additional aspects of the present invention, shown here as applied to a stacked flat plate capacitor with multiple pairs of plates, in elevation view. FIG. 2c is similar to FIG. 1c. As before, each plate 1x is paired with plate 2x, and the two plates of each pair are separated by dielectric 3. Dielectric 5 is located outside the intraplate internal volume of the plate array, but inside the non-extraneous plate array as a whole (i.e. between the outermost non-extraneous conductive elements of the plate array, which in FIG. 2c are plates 1a and 2c). Dielectric 4 is located outside the non-extraneous plate array as a whole, and also outside the outermost conductive element. Dielectric 4' is located inside the outermost conductive element, but outside the non-extraneous plate array as a whole, and is thus regarded as an instance of dielectric 4. The improvements shown in FIG. 2c comprise: first, a substantial plate surface area 16, which is located outside the intraplate internal volume of the plate array, indeed in this case outside the main (non-extraneous) plate array; second, multiple instances of a substantial plate surface area 17, which is located outside the intraplate internal volume of the plate array, but inside the extraplate internal volume of the non-extraneous plate array (i.e. between the outermost non-extraneous elements of the plate array). In a given capacitor, either one or both of these improvements could be employed.

Surface areas 16 and 17 are each a substantial plate surface area that is extraneous. Each is extraneous by virtue of not substantially contributing to the capacitance of the capacitor. Each is also extraneous by virtue of being located outside the intraplate internal volume of the capacitor plate array. Each is also extraneous by virtue of being left over as a remainder, after all portions of surface area on every plate 2x are paired off with a matching portion of surface area on paired oppositely facing plate 1x, where plates 1x and 2x are ordered mutually facing pairs all having the same ordered pair diverse polarity sequence.

Within the stacked capacitor plate array of FIG. 2c there are multiple instances of plate surface area 17, which might resemble main (non-extraneous) plates 1x and 2x in size, structure, and even manner of electrical connection. But they can be readily distinguished from main (non-extraneous) plates or plate surface areas, by several possible criteria.

For example, the plate surface areas that are non-extraneous could be designated as follows. Non-extraneous plate surface area must be part of a qualifying plate. In order to be a qualifying plate, a plate must be a member of a set of a plurality of plates, all of the plates in this set being oppositely or mutually facing, a plurality of this set being electrically connected in diverse polarity from one another, and a plurality of this set contributing substantial capacitance to the capacitor.

Only one such set of plates may be designated per capacitor (this clearly distinguishes any plates that are left over after one such set is designated).

A repeating plurality of this designated set of plates also qualifies, provided all repetitions have substantially the same structure as one another, and provided all plates in each repetition are electrically connected in the same ordered diverse polarity sequence.

Non-extraneous plate surface area belongs to a plate in the designated qualifying set or one of its qualifying repetitions, and furthermore is located inside the intraplate internal volume of the designated set or one of its qualifying repetitions.

An extraneous plate surface area is a plate surface area that is located outside the intraplate internal volume of the designated set of qualifying plates, and located outside the intraplate internal volume of all qualifying repetitions of this designated set of qualifying plates.

In all prior art capacitors, all of the plate surface area has been non-extraneous as defined by the above criteria. The present invention is distinct over prior art in providing further plate surface area that is extraneous by the above criteria.

For example, in FIG. 2c plates 1a and 2a form a qualifying set of plates, since plates 1a and 2a are oppositely facing, are electrically connected in diverse polarity, and do contribute substantial capacitance. Let plates 1a–2a therefore be the designated qualifying set of plates. Furthermore, the plate pairs 1b–2b and 1c–2c are qualifying repetitions of this designated set, since they have substantially the same structure and are connected in the same ordered diverse polarity sequence. Then plate surface areas 17 are extraneous, by virtue of being located outside the intraplate internal volume of the designated set and all its qualifying repetitions.

Extraneous plate surface areas 16 or 17 might be smaller, larger, or equal to plate 1x or 2x in either dimension, or in a plurality of dimensions. Extraneous plate surface areas 16 or 17 might be shaped in a variety of ways, including three dimensionally, and might comprise a variety of distinct segments.

For example, in FIG. 2c plate surface area 16 is shown larger in dimensions than plate 1x or 2x, and is shown shaped like a U channel, substantially covering the top, left, and right faces of the plate array as shown in elevation view. The foreground and rear faces of the plate array could be covered by end sprays 8a, 8b (not shown here; refer to FIG. 1d); these faces could also be covered by plate surface area 16, with dielectric 4' intervening between end spray 8a or 8b and plate surface area 16 if both are employed.

As FIG. 2c shows, a substantial portion (e.g. more than one tenth) of a contiguous element, U-channel-shaped extraneous plate surface area 16, is substantially parallel to and proximate to a non-extraneous plate, for example the most proximate plate 1a, and is spaced at a distance from this plate, by dielectric 4' acting as an intervening insulator (which could be air), whereby this parallel portion of element 16 is not immediately adjacent to the most proximate non-extraneous plate 1a. This parallel portion is also overlapping to plate 1a, whereby a line could be drawn perpendicular to this parallel portion that will intersect both with this parallel portion and plate 1a Thus, this substantial, parallel, spaced, overlapping portion could act advantageously, with similar effects discussed above for FIG. 2b. Incidentally, FIG. 2c also shows further elements 17 which contain portions of extraneous plate surface area, but which are not contiguous with the element 16 containing extraneous plate surface area.

In the FIG. 2c example, dielectric 4', acting as a spacing insulator, is shown as being approximately the same thickness as an instance of dielectric 3 that separates non-extraneous plates (e.g. plates 1a and 2a). As is recognized by the art, dielectric 3 is typically very thin, especially when dielectric 3 is a solid or liquid material, since capacitance is inversely proportional to the distance between plates. Thus there could still be significant effects and advantages, similar to those discussed for FIG. 2b, if dielectric 4' were thicker than dielectric 3, i.e. if the distance from most proximate plate 1a to the substantially parallel, overlapping, proximate portion of extraneous plate surface area 16 were greater than the average distance between non-extraneous plates (e.g. plates 1a and 2a), up to a limit, for example the first distance being no more than ten times the second distance.

This limit on distance logically follows from principles recognized by the art, as discussed above for FIG. 2b, whereby the desired effects depend on surface area as well as proximity. If only a portion of element 16 containing extraneous plate surface area is substantially parallel to and overlapping to and proximate to plate 1a, then the distance between this portion and plate 1a should be reduced or limited, in order to maintain the same desired level of effects between the two conductive surfaces. For example, to obtain the same desired density level of electrical charge/discharge function throughout contiguous extraneous plate surface area 16 would require higher stimulation of that portion of extraneous plate surface area 16 which is substantially parallel to and overlapping to and proximate to plate 1a, and thus would require closer spacing of this parallel portion of extraneous plate surface area 16 to plate 1a, than if the entirety of extraneous plate surface area 16 were substantially parallel to and overlapping to and proximate to plate 1a.

Therefore, in the case where only a substantial portion of a contiguous element containing extraneous plate surface area (as opposed to the entire contiguous element) is substantially parallel to and overlapping to and proximate to a non-extraneous plate, it could be appropriate to limit the average distance of this substantially parallel and proximate portion from the most proximate non-extraneous plate to being no more than ten times the average distance between non-extraneous plates. It is noted that this appropriate limit also clearly distinguishes the present invention over any prior art structures which incidentally employ an outer conductive canister to protect a capacitor; in all such cases, prior art has separated the outer canister from the outermost non-extraneous plate by an intervening spacing insulator which is more than ten times thicker than the very thin dielectric employed between non-extraneous plates. It is further noted that the present invention's structural features, wherein this parallel proximate portion is overlapping to, as well as spaced from, the most proximate non-extraneous plate, clearly distinguish the structure of the present invention from terminal structures and end spray structures employed in prior art capacitors. The above considerations for FIG. 2c also apply to the discussion below of FIG. 3e.

In FIG. 2c plate surface areas 17 are shown as being substantially the same size and shape as plates 1x and 2x; they could be larger or smaller, or shaped differently, yet still be inside the plate array as shown.

FIG. 2c shows, for a stacked capacitor, how extraneous plate surface area might be added outside a capacitor plate array, or inside a capacitor plate array (inside the extraplate internal volume, which is outside the intraplate internal volume).

Figure 2D:
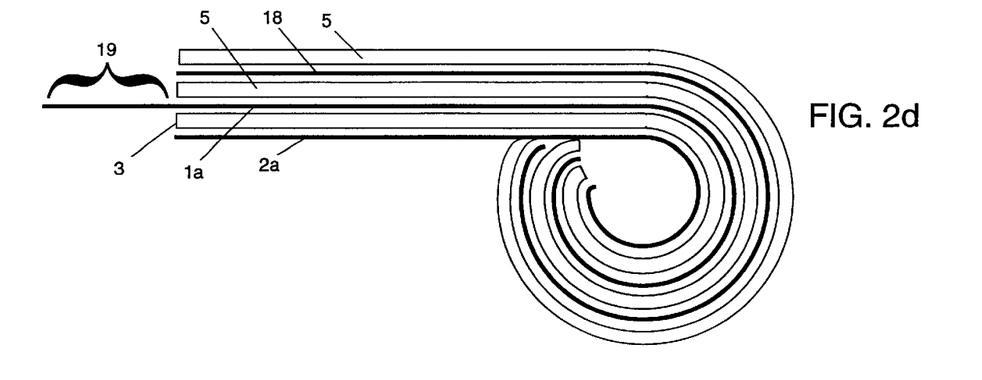
FIG. 2d shows one embodiment of the present invention, as applied to a roll capacitor, in elevation view of the plate edges.

FIG. 2d shows a similar variety of some possibilities for a roll capacitor, thereby illustrating some further possible embodiments of the present invention. FIG. 2d is similar to FIG. 1f, showing in elevation end view a detail of how a multilayer sandwich with a single pair of capacitive plates is formed into a three dimensional shape by being rolled up into a cylindrical roll capacitor. As before, plate 1a is paired with facing plate 2a, with dielectric 3 intervening, and dielectric 5 being outside the intraplate internal volume of the paired plate array. The improvements shown in FIG. 2d comprise: first, an extraneous plate surface area 18, separated from plate 1a by another layer of dielectric 5; second, an extraneous plate surface area 19. In a given capacitor, either one or both of these improvements could be employed.

Before the multilayer sandwich is rolled up, extraneous plate surface area 18 appears similar to extraneous plate surface area 15 in FIG. 2b, being a single plate surface area, and being located outside the main plate array. But when the multilayer sandwich is rolled up to form a roll capacitor, extraneous plate surface area 18 appears similar to plate surface areas 17 in FIG. 2c, being stacked in multiple layers, and being represented inside the main plate array, in this case at every layer of extraplate internal volume.

Likewise, extraneous plate surface area 19 is shown as an extension of plate 1a beyond plate 2a, and as such appears similar to plate surface area 14 in FIG. 2a. But when the multilayer sandwich is rolled up to form a roll capacitor, it can be appreciated that extraneous plate surface area 19 would occupy part or all of the outer circumference of the roll capacitor, and as such would be similar to plate surface area 16 in FIG. 2c, being the outermost conductive element and located outside the main (non-extraneous) plate array. Plate surface area 19 could be designed to extend less than one full circumference around the finished roll capacitor, or exactly one full circumference, or more than one full circumference. There could be various advantages to each of these configurations for different applications.

Plate surface area 19 could be structurally an extension of plate 1a beyond 2a (as shown), or an extension of plate 2a beyond 1a, thereby also being electrically connected to one main plate or the other. Plate surface area 19 could further be structurally supported by an extension of a dielectric layer such as dielectric 3 or 5; this would be especially appropriate if plate surface area 19 consisted of metallization of a dielectric layer rather than a plate capable of self support. Plate surface area 19 could be electrically and structurally contiguous with plate 1a (as shown) or plate 2a; or it could be an electrically separate segment extending beyond the plate array (for example, it could be a separate segment of metallization on an extended dielectric 3 as a supporting substrate, with the metallization called plate 1a and/or 2a also being supported by dielectric 3). Again, there could be various advantages to each of these configurations for different applications.

Alternatively or additionally, plate surface area 19 could be structurally independent of both plates 1a and 2a. For example, it could structurally be an extension of extraneous plate surface area 18; and/or it could be an extraneous plate surface that is applied as an outer wrap would be, wrapped as a cylindrical layer (or layers) on the outside of the plate array after the multilayer sandwich has been completely rolled up into a cylinder. It could electrically be connected to either plate 1a, or plate 2a, or to some other electrical point, or to nothing. Again, there could be various advantages to each of these configurations for different applications.

Surface areas 18 and 19 are each a substantial plate surface area that is extraneous. Each is extraneous by virtue of not substantially contributing to the capacitance of the capacitor. Each is also extraneous by virtue of being located outside the intraplate internal volume of the capacitor plate array. Each is also extraneous by virtue of being left over as a remainder, after all portions of surface area on plate 2a are paired off with a matching portion of surface area on paired facing plate 1a.

Figure 2E:
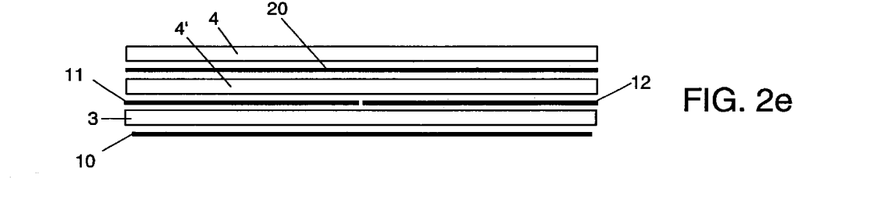
FIG. 2e shows one embodiment of the present invention, as applied to a basic flat three plate capacitor, in elevation view of the plate edges.

FIG. 2e shows some possible configurations from the above embodiments as applied to a capacitor with a trio plate structure. FIG. 2e shows a trio plate capacitor in elevation view of the plate edges, and is similar to FIG. 1g. As before, plates 11 and 12 jointly face large plate 10, across dielectric 3. The volume of space occupied by plates 10, 11, 12 and dielectric 3 delimits the intraplate internal volume of the capacitor plate array. As discussed above, in a plate structure comprising three or more mutually facing plates contributing substantial capacitance, the intraplate internal volume extends out to the outermost peripheral edges of the outermost of all the mutually facing plates. Dielectric 4 lies outside this intraplate internal volume, and outside the plate array as a whole. The improvement comprises an extraneous plate surface area 20. Plate surface area 20 could be on the side with plates 11 and 12, separated from them by dielectric 4', as shown in FIG. 2e; or it could be on the side with plate 10, separated from it by dielectric 4', or it could be on both sides. Plate surface area 20 could be smaller than either plate 11 or 12, or larger than plate 10, or anywhere in between. This type of configuration could also be applied to capacitors employing mutually facing quartets or n-tuples of plates instead of trios, etc.

The capacitor including extraneous plate surface area 20 could remain flat as shown in FIG. 2e, or it could be rolled up to form a roll capacitor, in a manner similar to that shown in FIG. 2d. Multiples of the structure shown in FIG. 2e could be stacked, to form a stacked plate capacitor, similar to that shown in FIG. 2c.

Surface area 20 is a substantial plate surface area that is extraneous. It is extraneous by virtue of not substantially contributing to the capacitance of the capacitor. It is also extraneous by virtue of being located outside the intraplate internal volume of the capacitor plate array. It is also extraneous by virtue of being left over as a substantial remainder, after substantially all portions of surface area on plate 10 are paired off with a matching portion of surface area found on plates 11 and 12 that are jointly paired with plate 10 and are oppositely facing to plate 10.

A stacked capacitor could be formed from repeated multiples of the structure shown in FIG. 2e. The overall structure contains a designatable substructure, comprising the mutually facing trio of plates 10, 11, 12, which are electrically connected in diverse polarity, with a certain defined ordered polarity sequence. If this same ordered polarity sequence is followed for all the multiple instances of this designated trio structure 10x, 11x, 12x throughout the stack, then all the plates in all instances of this designated trio structure throughout the stack could qualify as having non-extraneous plate surface areas. The same would be true for a designated substructure comprising a mutually facing quartet or n-tuple of plates. Any substantial plate surface area located outside the intraplate internal volume of this mutually facing trio (or n-tuple) substructure and its repeated multiple instances in the stack could qualify as extraneous.

3. Electrical Connections to Extraneous Plate Surface Area

The preceding section described a variety of possible embodiments of the present invention, showing a variety of possible structural configurations for the extraneous plate surface area. Any of the variety of structural configurations of extraneous plate surface area could be electrically connected in any of a variety of manners.

The electrical connections to the conventional plates 1x and 2x (comprising the non-extraneous plate surface area) are not shown, and could follow any of the conventional manners known to the art. The art recognizes that such connections themselves are not plates, and therefore that any surface area of such connections cannot be considered plate surface area or extraneous plate surface area.

FIGS. 3a–3e show some of the possible manners of electrical connection that could be made to any one or more of the possible structural configurations of extraneous plate surface area.

FIGS. 3a–3d illustrate some possible electrical connections using as a structural model a basic flat plate capacitor with one pair of main plates, seen in elevation view of the plate edges. The model for FIGS. 3a–3d is similar to FIG. 2b. Electrical connections are shown schematically; their structural implementation could be via any of the means known to the art.

Figure 3A:
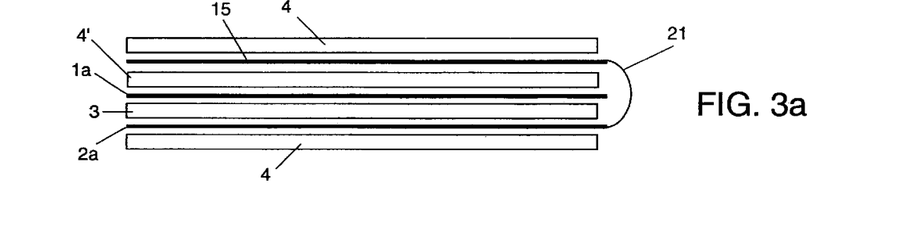
FIGS. 3a–3d show some embodiments of electrical connection for the present invention, as applied to a basic flat two plate capacitor, in elevation view of the plate edges.

FIG. 3a shows plates 1a and 2a, separated by dielectric 3, and extraneous plate surface area 15, located proximate to plate 1a and separated from plate 1a by dielectric 4'. An electrical connection 21 connects plate surface area 15 to plate 2a. This manner of connection has been experimentally demonstrated to yield capacitor performance superior to the prior art, where no extraneous plate surface area at all is present. But experiments thus far suggest that even better capacitor performance could sometimes be obtained via other manners of electrical connection, such as described below.

Figure 3B:
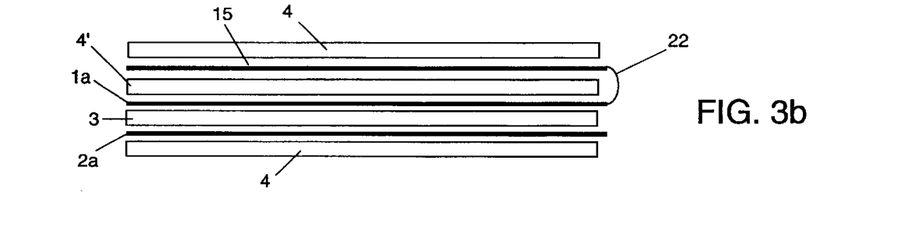

FIG. 3b is the same as FIG. 3a, except that an electrical connection 22 connects plate surface area 15 to proximate plate 1a, rather than to plate 2a. Thus, plate surface area 15 could act as a mirror or echo of the electrical charge movement in plate 1a, since the same electrical input is made available to both. It is further hypothesized that the sympathetic electrical charge movement in proximate plate surface area 15 might act as a beneficial buffer, or dynamic impedance transition zone, between plate 1a and the external world's space and dielectrics, on the side of plate 1a that faces away from plate 2a (plate 1a's charge/discharge partner). This might also beneficially act as a dynamic balancer of the charge/discharge forces and processes occurring only on one side of plate 1a, the side facing plate 2a.

Figure 3C:
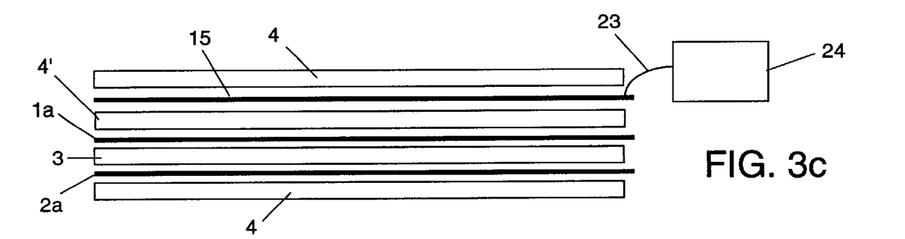

In FIG. 3c, an electrical connection 23 connects plate surface 15 to an external electrical element 24, such as a reference, regulator source, or circuit. This external element could for example be a voltage or charge source, which could bias or polarize plate surface 15. This bias could be a fixed voltage or charge, instead of the dynamically varying charge produced by the connection shown in FIG. 3b. It is hypothesized that this fixed voltage or charge could beneficially provide a neutral environment for the desired charge/discharge actions between plates 1a and 2a, just as a polarized or charged enveloping surface provides a neutral electrical environment for all points contained inside it. This might be especially efficacious when the extraneous plate surface areas are structurally shaped in an enveloping manner, such as 16 in FIG. 2c and 19 in FIG. 2d.

Alternatively or additionally, external electrical element 24 could be a source, regulator, or circuit providing for a varying instead of fixed voltage, charge, bias, or polarization to the capacitor. For example, a varying voltage source might advantageously be made to apply a signal to the extraneous plate surface area that might complement a main signal being processed by the capacitor in some manner, whereby the performance of the capacitor might be improved. Such a complementing signal might, for example, balance or offset some fields produced by the main signal being processed by the capacitor, and thus might advantageously provide for less distortion from some causes, such as the imperfect behavior of the dielectric or dielectrics of the capacitor in response to the main signal being processed by the capacitor.

Each extraneous plate surface area or segment could have one or more electrical connections. For example, an external current source could feed current into one end of an extraneous plate surface area, and a second electrical connection at the other end could drain the current away, thus providing current flow through the extraneous plate surface area.

Figure 3D:
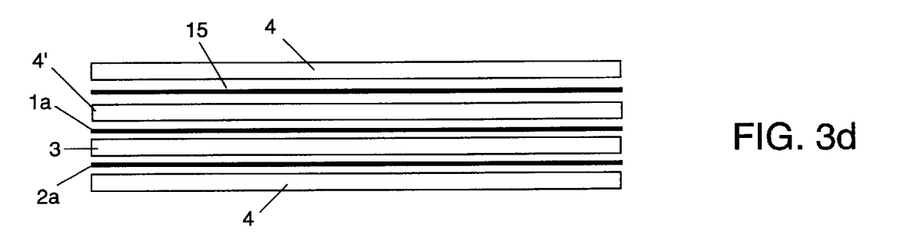

In FIG. 3d, extraneous plate surface 15 is not electrically connected to anything else; the electrical element that it is electrically connected to is nothing. It has been experimentally determined and demonstrated that this manner of electrical connection yields an excellent improvement in capacitor performance over prior art, and it is easy and economical to implement. There might be several reasons for this demonstrated improvement. For example, it is hypothesized that the electrical charge/discharge action and movement in proximate plate 1a might electrostatically cause some sympathetic electrical charge movement in plate surface area 15, which in turn might beneficially improve the charge/discharge action between plates 1a and 2a, thereby improving overall capacitor performance.

When there are plural extraneous plate surface areas or segments, each may be electrically connected in a different manner as another, or in the same manner.

Figure 3E:
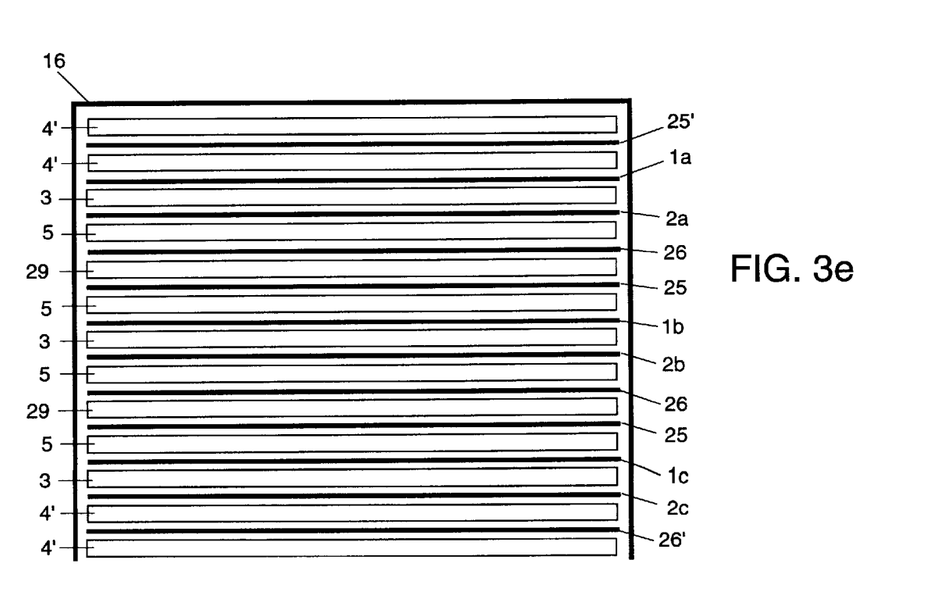
FIG. 3e shows one embodiment of the present invention, as applied to a stacked flat multiple plate capacitor, in elevation view of the plate edges.

FIG. 3e shows a stacked multiple plate capacitor, in elevation view, and is similar to FIG. 2c. As before, each plate 1x is paired with plate 2x, the two plates of each pair are separated by dielectric 3. As before, dielectric 5 is located outside the intraplate internal volume of the plate array, but inside the non-extraneous plate array as a whole, while dielectric 4' is located outside the non-extraneous plate array as a whole. As before, extraneous plate surface area 16 is located outside the volume of the main (non-extraneous) plate array. In FIG. 3e, extraneous plate surface area 16 is shown electrically connected to nothing.

In FIG. 2c, multiple instances of extraneous plate surface area 17 were located inside the extraplate internal volume of the plate array, with one instance of plate surface area 17 per layer of extraplate internal volume. The FIG. 3e example expands upon this structural configuration, replacing each plate surface area 17 of FIG. 2c with two extraneous plate surface areas, a plate surface area 25 and a plate surface area 26. Thus, each layer of extraplate internal volume, separating one pair of main (non-extraneous) plates 1x, 2x from another pair of main plates 1x, 2x, is occupied by two extraneous plate surface areas instead of one.

As noted previously, extraneous plate surface areas could be added either inside or outside an existing non-extraneous plate array, or both. The above extraneous plate surface areas 25, 26 happen to be located inside the volume of the main, non-extraneous plate array as a whole, i.e. between the outermost non-extraneous conductive elements, which in FIG. 3e are plates 1a and 2c. Additionally, two further extraneous plate surface areas 25' and 26' are shown added, and they happen to be located outside the volume of the non-extraneous plate array as a whole.

Thus, each main plate 1x or 2x now has its own extraneous plate surface area, which might beneficially act as a mirror or buffer for that one plate. Each plate surface area 25 is proximate to a main plate 1x, and might thus tend to act as a mirror, buffer, etc. for charge/discharge activity primarily on this one plate 1x. Likewise, each plate surface area 26 is proximate to a main plate 2x, and might thus tend to act as a mirror, buffer, etc. for charge/discharge activity primarily on this one plate 2x.

A layer of dielectric 5 or 4' separates each plate surface area 25 from its proximate main plate 1x, and a layer of dielectric 5 or 4' separates each plate surface area 26 from its proximate main plate 2x. Proximate plate surface areas 25, 26 are separated from each other by a dielectric 29.

In the FIG. 3e example, each of the extraneous plate surface areas 25, 26 could be variously or similarly electrically connected, to nothing (as shown), or to some other conductive or electrical element.

Each surface area 25 or 26 is a substantial plate surface area that is extraneous. Each is extraneous by virtue of not substantially contributing to the capacitance of the capacitor. Each is also extraneous by virtue of being located outside the intraplate internal volume of the capacitor plate array. Each is also extraneous by virtue of being left over as a remainder, after all portions of surface area on every plate 2x are paired off with a matching portion of surface area on paired oppositely facing plate 1x, where plates 1x and 2x are ordered mutually facing pairs all having the same ordered pair diverse polarity sequence.

Structural configurations and manners of electrical connection taught by the present invention, which are applicable to stacked multilayer capacitors, are also applicable to roll multilayer capacitors, and vice versa, even where such embodiments are not explicitly shown in the specification. Various or different aspects of possible embodiments, as shown or described above, could be combined in various combinations to produce further embodiments of the present invention.

It is understood that, in accordance with the present invention, any instance of dielectric in a capacitor could be varied and different from other instances in the same capacitor, and could be different in structure and/or material, or could be substantially the same, whether these various instances have been assigned the same reference numeral in this specification (e.g. 3, 4, 4', 5, 29) or different reference numerals. The material and structure of each dielectric at each location could be critical in affecting the performance of the capacitor, and could be optimized in novel ways. This is the subject of separate patent applications by the inventor.

The material and structure of each extraneous plate surface area could also be critical in affecting the performance of the capacitor, and should be optimized for desired performance results. Different extraneous plate surface areas within a single capacitor might differ from one another in material and structure, and even one extraneous plate surface area might be nonuniform within itself. It is contemplated that various conductive materials, including high resistivity materials, could beneficially be employed for extraneous plate surface areas.

As shown in the drawings, all portions of the extraneous plate surface areas 14, 15, 17, 18, 19, 20 are, as claimed by the present invention, jointly or severally, either substantially coplanar with some non-extraneous plate surface area (e.g. as shown in FIG. 2a), or substantially parallel with some non-extraneous plate surface area (e.g. as shown in FIGS. 2b, 2c, 2e, 3a–3e, and for non-extraneous plate surface area 18 in FIG. 2d), or substantially coradial with some non-extraneous plate surface area (e.g. as shown for a short non-extraneous plate surface area 19 in FIG. 2d when the capacitor is rolled up), or some combination thereof (e.g. as in FIG. 2d, where the portion of a long extraneous plate surface area 19 nearest the non-extraneous plate surface area of plate 1a would be substantially coradial with this non-extraneous plate surface area of plate 1a when the capacitor is rolled up, while the farther portion of this same long extraneous plate surface area 19 would be substantially parallel with this non-extraneous plate surface area of plate 1a when the capacitor is rolled up). This is in keeping with the objects and advantages of the present invention, wherein the claimed extraneous plate surface area could act as a termination stub (e.g. as in FIG. 2a), or could act as a sympathetic echo or mirror (e.g. as in FIGS. 2b, 2c, 2e, 3a–3e), or could act as some combination thereof (e.g. as in FIG. 2d when the capacitor is rolled up).

However, the present invention can still provide capacitor performance advantages, in keeping with the teachings of the present invention, even when not thus limited, that is even when portions of the extraneous plate surface area are neither coplanar nor coradial nor parallel with non-extraneous plate surface area. For example, as shown by extraneous plate surface area 16 in FIGS. 2c and 3e, when a substantial portion (greater than one tenth) of a contiguous element containing extraneous plate surface area is parallel to, proximate to, overlapping to, and spaced from a non-extraneous plate surface area, it can still provide capacitor performance advantages, in keeping with the teachings of the present invention, provided that the spacing distance from this parallel, overlapping portion to the most proximate non-extraneous plate surface area is kept relatively small, for example being no greater than ten times the average distance between non-extraneous plates in the capacitor.

Any definitions or criteria given in this specification are possible illustrative examples, contributing to the description of some possible embodiments of the present invention. These definitions and criteria do not delimit the present invention, either inclusively or exclusively.

Although the present invention has been described in considerable detail in the above specification, it is not intended that the invention be limited to such detail except as necessitated by the appended claims or their legal equivalent.

I claim:

1. An electrical capacitor comprising,
    a first plate with a first surface area on said first plate, at least some of said first surface area contributing substantial capacitance to said capacitor,
    a second plate with a second surface area on said second plate, at least some of said second surface area contributing substantial capacitance to said capacitor,
    a dielectric,
    and a means suitable for making electrical connection to an element selected from the group consisting of said first plate and said second plate,
    said first plate and said second plate being oppositely facing, and being distinctly electrically connected in diverse polarity, and being separated a first average distance by said dielectric,
    said dielectric comprising a material, said material having a form selected from the group consisting of being liquid at 1 degree celsius and being solid at 1 degree celsius and some combination thereof,
    said first surface area being substantially equal to said second surface area,
    the improvement comprising a substantial further plate surface area that is extraneous by virtue of being located outside the intraplate internal volume,
    said extraneous further plate surface area being disposed in a manner selected from the group consisting of:
        all portions of said extraneous further plate surface area being jointly or severally disposed to have a geometrical relationship to said first surface area, said geometrical relationship being selected from the group consisting of being substantially parallel to said first surface area, and being substantially coplanar with said first surface area, and being substantially coradial with said first surface area, and some combination thereof,
        and a first portion greater than one tenth of a contiguous element containing said extraneous further plate surface area being disposed substantially parallel to and overlapping to said first surface area, said first portion being spaced from said first surface area at a second average distance by an intervening insulator, said second average distance being no more than ten times greater than said first average distance.

2. The capacitor of claim 1 wherein said further plate surface area is extraneous by virtue of having a property selected from the group consisting of:
    not contributing substantial capacitance to said capacitor,
    and being left over as a remainder after substantially all possible substantially equal portions of plate surface area on said first plate and said second plate have been jointly paired off.

3. The capacitor of claim 1 wherein said further plate surface area is electrically connected in a manner selected from the group consisting of: being electrically connected to said first plate, and being electrically connected to said second plate, and being electrically connected to an external circuit, and being electrically connected to an external biasing or polarizing source, and being electrically connected to an external voltage, and being electrically connected to an external current, and being electrically connected to an external charge, and being electrically connected to an external signal, and not being electrically connected to any other electrically conductive element.

4. The capacitor of claim 1 formed into a three dimensional shape.

5. A capacitor,
    comprising a single plate structure,
    a dielectric,
    and a means suitable for making electrical connection to said single plate structure,
    said single plate structure comprising a plurality of mutually facing plates,
    at least two among said plurality of mutually facing plates being electrically connected in diverse polarity from one another,
    at least two among said plurality of mutually facing plates being oppositely facing to one another and being separated a first average distance by said dielectric,
    said dielectric comprising a material, said material having a form selected from the group consisting of being liquid at 1 degree celsius and being solid at 1 degree celsius and some combination thereof,
    at least two among said plurality of mutually facing plates having plate surface areas that contribute to the capacitance of said capacitor,
    the improvement comprising a substantial further plate surface area that is extraneous by virtue of being located outside the intraplate internal volume of said single plate structure,
    said extraneous further plate surface area being disposed relative to at least one of said mutually facing plates, in a manner selected from the group consisting of:
        all portions of sail extraneous further plate surface area being jointly or severally disposed to have a geometrical relationship to at least one of said mutually facing plates, said geometrical relationship being selected from the group consisting of being substantially parallel to at least one of said mutually facing plates, and being substantially coplanar with at least one of said mutually facing plates, and being substantially coradial with at least one of said mutually facing plates, and some combination thereof,
        and a first portion greater than one tenth of a contiguous element containing said extraneous further plate surface area being disposed substantially parallel to and overlapping to a plate among said mutually facing plates, said first portion being spaced from said plate at a second average distance by an intervening insulator, said second average distance being no more than ten times greater than said first average distance.

6. The capacitor of claim 5, wherein said plate surface areas of said mutually facing plates in said single plate structure are paired off to a maximum extent, where each pairing off comprises a first plate surface area, of a first plate of said mutually facing plates, paired off with a second substantially equal plate surface area, of a second plate that is oppositely facing to said first plate of said mutually facing plates,
    said further plate surface area being extraneous by virtue of having a property selected from the group consisting of:
        being left over as a substantial remainder after said plate surface areas of said mutually facing plates in said single plate structure have been paired off,
        and not contributing substantial capacitance to said capacitor.

7. The capacitor of claim 5, comprising plural instances of said single plate structure, repeated in substantially identical form with the same ordered sequence of diverse polarities among the plurality of mutually facing plates of said single plate structure.

8. The capacitor of claim 5 wherein said further plate surface area is electrically connected in a manner selected from the group consisting of: being electrically connected to an element of said single plate structure, and being electrically connected to an external circuit, and being electrically connected to an external biasing or polarizing source, and being electrically connected to an external voltage, and being electrically connected to an external current, and being electrically connected to an external charge, and being electrically connected to an external signal, and not being electrically connected to any other electrically conductive element.

9. The capacitor of claim 5 formed into a three dimensional shape.

10. A method for creating a capacitor with improved electrical performance, said method comprising the step of creating a capacitor, comprising a single plate structure, a dielectric, and a means suitable for making electrical connection to said plate structure, said single plate structure comprising a plurality of mutually facing plates, at least two among said plurality of mutually facing plates being electrically connected in diverse polarity from one another, at least two among said plurality of mutually facing plates being oppositely facing to one another and being separated a first average distance by said dielectric, said dielectric comprising a material, said material having a form selected from the group consisting of being liquid at 1 degree celsius and being solid at 1 degree celsius and some combination thereof, at least two among said plurality of mutually facing plates having plate surface areas that contribute to the capacitance of said capacitor, and the step of creating a substantial further plate surface area that is extraneous by virtue of being located outside the intraplate internal volume of said single plate structure, said extraneous further plate surface area being disposed relative to at least one of said mutually facing plates, in a manner selected from the group consisting of:

all portions of said extraneous further plate surface area being jointly or severally disposed to have a geometrical relationship to at least one of said mutually facing plates, said geometrical relationship being selected from the group consisting of being substantially parallel to at least one of said mutually facing plates, and being substantially coplanar with at least one of said mutually facing plates, and being substantially coradial with at least one of said mutually facing plates, and some combination thereof, and a first portion greater than one tenth of a contiguous element containing said extraneous further plate surface area being disposed substantially parallel to and overlapping to a plate among said mutually facing plates, said first portion being spaced from said plate at a second average distance by an intervening insulator, said second average distance being no more than ten times greater than said first average distance.

11. The method of claim 10, wherein said plate surface areas of said mutually facing plates in said single plate structure are paired off to a maximum extent, where each pairing off comprises a first plate surface area, of a first plate of said mutually facing plates, paired off with a second substantially equal plate surface area, of a second plate that is oppositely facing to said first plate of said mutually facing plates, said further plate surface area being extraneous by virtue of having a property selected from the group consisting of:

being left over as a substantial remainder after said plate surface areas of said mutually facing plates in said single plate structure have been paired off, and not contributing substantial capacitance to said capacitor.

12. The method of claim 10, said capacitor comprising plural instances of said single plate structure, repeated in substantially identical form with the same ordered sequence of diverse polarities among the plurality of mutually facing plates of said single plate structure.

13. The method of claim 10 wherein said further plate surface area is electrically connected in a manner selected from the group consisting of: being electrically connected to an element of said single plate structure, and being electrically connected to an external circuit, and being electrically connected to an external biasing or polarizing source, and being electrically connected to an external voltage, and being electrically connected to an external current, and being electrically connected to an external charge, and being electrically connected to an external signal, and not being electrically connected to any other electrically conductive element.

14. The method of claim 10 wherein said capacitor is formed into a three dimensional shape.

* * * * *